(12) United States Patent
Dorman et al.

(10) Patent No.: US 9,575,981 B2
(45) Date of Patent: Feb. 21, 2017

(54) CLOUD SERVICE ENABLED TO HANDLE A SET OF FILES DEPICTED TO A USER AS A SINGLE FILE IN A NATIVE OPERATING SYSTEM

(75) Inventors: Griffin Dorman, San Francisco, CA (US); Satish Asok, Union City, CA (US); Matthew Self, Emerald Hills, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 13/618,993

(22) Filed: Sep. 14, 2012

(65) Prior Publication Data
US 2013/0275398 A1    Oct. 17, 2013

Related U.S. Application Data

(60) Provisional application No. 61/622,868, filed on Apr. 11, 2012.

(51) Int. Cl.
*G06F 17/30*    (2006.01)

(52) U.S. Cl.
CPC ... *G06F 17/30126* (2013.01); *G06F 17/30153* (2013.01); *G06F 17/30176* (2013.01); *G06F 17/30197* (2013.01)

(58) Field of Classification Search
CPC .................................. G06F 17/00; G06F 17/30
See application file for complete search history.

(56) References Cited

U.S. PATENT DOCUMENTS

| 858,619 A | 7/1907 | O'Farrell |
| 5,043,876 A * | 8/1991 | Terry ............................. 707/649 |
| 5,748,735 A | 5/1998 | Ganesan |
| 5,774,717 A | 6/1998 | Porcaro |
| 5,787,175 A | 7/1998 | Carter |
| 5,799,320 A | 8/1998 | Klug |
| 5,848,415 A | 12/1998 | Guck |

(Continued)

FOREIGN PATENT DOCUMENTS

| CA | 2724521 | 11/2009 |
| CN | 101997924 A | 3/2011 |

(Continued)

OTHER PUBLICATIONS

International Search Report and Written Opinion for PCT/US2008/012973 dated Apr. 30, 2009, pp. 1-11.

(Continued)

*Primary Examiner* — Farhan Syed
(74) *Attorney, Agent, or Firm* — Perkins Coie LLP

(57) ABSTRACT

Systems and methods method enabling file actions to be performed on a folder structure in a cloud-based service are disclosed. In one aspect, embodiments of the present disclosure include a method, which may be implemented on a system, for representing the folder structure in a user interface to the cloud-based service as a file and enabling file actions to be performed on file representing the folder structure in the user interface to the cloud-based service. In one embodiment, the folder structure and associated content is stored on a server which provides the cloud-based service in a compressed file format which is able to preserve the metadata associated with the folder structure which indicates its representation as the file in the user interface.

24 Claims, 12 Drawing Sheets

(56) References Cited

U.S. PATENT DOCUMENTS

| | | |
|---|---|---|
| 5,864,870 A * | 1/1999 | Guck .............. G06F 17/30569 |
| 5,926,816 A | 7/1999 | Bauer et al. |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,279,109 B1 | 8/2001 | Brundridge |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,446,091 B1 | 9/2002 | Noren et al. |
| 6,449,622 B1 | 9/2002 | LaRue et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,080,104 B2 | 7/2006 | Ring et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,155,483 B1 | 12/2006 | Friend et al. |
| 7,165,107 B2 | 1/2007 | Pouyoul et al. |
| 7,171,468 B2 | 1/2007 | Yeung et al. |
| 7,178,021 B1 | 2/2007 | Hanna et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,380,120 B1 | 5/2008 | Garcia |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,653,668 B1 | 1/2010 | Shelat et al. |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,739,411 B2 | 6/2010 | Messer et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,201,230 B2 | 6/2012 | Day et al. |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,447,820 B1 | 5/2013 | Gay |
| 8,464,161 B2 | 6/2013 | Giles et al. |
| 8,473,775 B1 | 6/2013 | Helmick et al. |
| 8,515,902 B2 | 8/2013 | Savage |
| 8,527,549 B2 * | 9/2013 | Cidon .............. G06F 17/30174 707/802 |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,719,810 B2 | 5/2014 | Oh |
| 8,745,267 B2 | 6/2014 | Luecke et al. |
| 8,782,637 B2 * | 7/2014 | Khalid ........................ 718/1 |
| 8,825,597 B1 | 9/2014 | Houston et al. |
| 8,849,955 B2 * | 9/2014 | Prahlad .............. G06F 17/3002 709/211 |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,179 B2 | 2/2015 | Besen et al. |
| 8,949,939 B2 | 2/2015 | Peddada |
| 8,955,103 B2 | 2/2015 | Kline, III et al. |
| 8,959,579 B2 | 2/2015 | Barton et al. |
| 8,966,062 B1 | 2/2015 | Giese et al. |
| 8,990,307 B2 | 3/2015 | Barreto et al. |
| 8,990,955 B2 | 3/2015 | Hymel et al. |
| 9,015,248 B2 | 4/2015 | Barreto et al. |
| 9,054,919 B2 | 6/2015 | Kiang et al. |
| 9,239,846 B2 | 1/2016 | Besen et al. |
| 9,244,934 B2 | 1/2016 | Besen et al. |
| 9,292,833 B2 | 3/2016 | Savage |
| 9,396,216 B2 | 7/2016 | Barreto et al. |
| 9,396,245 B2 | 7/2016 | Mackenzie et al. |
| 9,507,795 B2 | 11/2016 | Dorman et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |

(56) References Cited

U.S. PATENT DOCUMENTS

| | | |
|---|---|---|
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0003104 A1 | 1/2004 | Boskovic et al. |
| 2004/0021686 A1 | 2/2004 | Barberis |
| 2004/0076187 A1 | 4/2004 | Peled |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1* | 6/2004 | Scardino ............ G06F 17/3028 |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0162836 A1 | 8/2004 | Aronoff et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0230652 A1 | 11/2004 | Estrada et al. |
| 2004/0246532 A1 | 12/2004 | Inada |
| 2004/0260977 A1 | 12/2004 | Ji et al. |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022175 A1 | 1/2005 | Sliger et al. |
| 2005/0022229 A1 | 1/2005 | Gabriel et al. |
| 2005/0028006 A1 | 2/2005 | Leser et al. |
| 2005/0033777 A1 | 2/2005 | Moraes et al. |
| 2005/0038831 A1 | 2/2005 | Souder et al. |
| 2005/0038997 A1 | 2/2005 | Kojima et al. |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097061 A1 | 5/2005 | Shapiro et al. |
| 2005/0097225 A1 | 5/2005 | Glatt et al. |
| 2005/0097434 A1 | 5/2005 | Storisteanu |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0172284 A1 | 8/2005 | Dandekar et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0173952 A1 | 8/2006 | Coyle |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0016680 A1 | 1/2007 | Burd et al. |
| 2007/0028291 A1 | 2/2007 | Brennan et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0179993 A1 | 8/2007 | Arruza |
| 2007/0195779 A1 | 8/2007 | Judge et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0281972 A1 | 11/2008 | Gupta et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |

(56) References Cited

U.S. PATENT DOCUMENTS

| | | |
|---|---|---|
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172201 A1 | 7/2009 | Carmel |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082396 A1 | 4/2010 | Caldwell et al. |
| 2010/0082534 A1 | 4/2010 | Sagar et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1 | 8/2010 | Stringer et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332818 A1* | 12/2010 | Prahlad .............. G06F 17/3002 713/150 |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | Van Der Linden et al. |
| 2011/0029883 A1 | 2/2011 | Lussier et al. |
| 2011/0040812 A1* | 2/2011 | Phillips .............. G06F 9/45541 707/822 |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1* | 3/2011 | Phillips .............. G06F 9/45533 707/827 |
| 2011/0055721 A1* | 3/2011 | Jain .................. G06Q 30/02 715/748 |
| 2011/0061045 A1* | 3/2011 | Phillips .............. G06F 9/45541 717/173 |
| 2011/0061046 A1* | 3/2011 | Phillips .............. G06F 9/45533 717/176 |
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145187 A1 | 6/2011 | Himmelsbach et al. |
| 2011/0145282 A1* | 6/2011 | Moore et al. ................. 707/769 |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1* | 9/2011 | Purcell ................ G06F 9/5072 705/7.27 |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |

(56) References Cited

U.S. PATENT DOCUMENTS

| | | | |
|---|---|---|---|
| 2011/0252071 A1* | 10/2011 | Cidon | G06F 17/30174 707/802 |
| 2011/0252312 A1 | 10/2011 | Lemonik et al. | |
| 2011/0252320 A1 | 10/2011 | Arrasvuori et al. | |
| 2011/0252339 A1 | 10/2011 | Lemonik et al. | |
| 2011/0258461 A1 | 10/2011 | Bates | |
| 2011/0258561 A1 | 10/2011 | Ladouceur et al. | |
| 2011/0277027 A1 | 11/2011 | Hayton et al. | |
| 2011/0282710 A1 | 11/2011 | Akkiraju et al. | |
| 2011/0289433 A1 | 11/2011 | Whalin et al. | |
| 2011/0296022 A1 | 12/2011 | Ferris et al. | |
| 2011/0313803 A1 | 12/2011 | Friend et al. | |
| 2011/0314145 A1 | 12/2011 | Raleigh et al. | |
| 2011/0320197 A1 | 12/2011 | Conejero et al. | |
| 2011/0320936 A1 | 12/2011 | Mohan et al. | |
| 2012/0057696 A1 | 3/2012 | Chew | |
| 2012/0064879 A1 | 3/2012 | Panei | |
| 2012/0072436 A1 | 3/2012 | Pierre et al. | |
| 2012/0079095 A1* | 3/2012 | Evans | G06F 8/61 709/224 |
| 2012/0089610 A1 | 4/2012 | Agrawal et al. | |
| 2012/0089659 A1 | 4/2012 | Halevi et al. | |
| 2012/0089710 A1 | 4/2012 | Rakowski et al. | |
| 2012/0092055 A1 | 4/2012 | Peschke et al. | |
| 2012/0096521 A1 | 4/2012 | Peddada | |
| 2012/0101995 A1 | 4/2012 | Agetsuma et al. | |
| 2012/0110005 A1 | 5/2012 | Kuo et al. | |
| 2012/0110436 A1 | 5/2012 | Adler, III et al. | |
| 2012/0110443 A1 | 5/2012 | Lemonik et al. | |
| 2012/0117626 A1 | 5/2012 | Yates et al. | |
| 2012/0124306 A1 | 5/2012 | Abercrombie et al. | |
| 2012/0124547 A1 | 5/2012 | Halbedel | |
| 2012/0130900 A1 | 5/2012 | Tang et al. | |
| 2012/0134491 A1 | 5/2012 | Liu | |
| 2012/0136936 A1 | 5/2012 | Quintuna | |
| 2012/0143825 A1 | 6/2012 | Boehm et al. | |
| 2012/0144283 A1 | 6/2012 | Hill et al. | |
| 2012/0150888 A1 | 6/2012 | Hyatt et al. | |
| 2012/0151265 A1 | 6/2012 | Bender et al. | |
| 2012/0151551 A1 | 6/2012 | Readshaw et al. | |
| 2012/0158908 A1 | 6/2012 | Luna et al. | |
| 2012/0159178 A1 | 6/2012 | Lin et al. | |
| 2012/0159310 A1 | 6/2012 | Chang et al. | |
| 2012/0166516 A1 | 6/2012 | Simmons et al. | |
| 2012/0173612 A1 | 7/2012 | Vegesna-Venkata et al. | |
| 2012/0173625 A1 | 7/2012 | Berger | |
| 2012/0179802 A1 | 7/2012 | Narasimhan et al. | |
| 2012/0179981 A1 | 7/2012 | Whalin et al. | |
| 2012/0185355 A1 | 7/2012 | Kilroy | |
| 2012/0185913 A1 | 7/2012 | Martinez et al. | |
| 2012/0192055 A1 | 7/2012 | Antebi et al. | |
| 2012/0192086 A1 | 7/2012 | Ghods et al. | |
| 2012/0203670 A1 | 8/2012 | Piersol | |
| 2012/0203908 A1 | 8/2012 | Beaty et al. | |
| 2012/0204032 A1 | 8/2012 | Wilkins et al. | |
| 2012/0206653 A1* | 8/2012 | Graves et al. | G11B 27/031 348/571 |
| 2012/0207449 A1* | 8/2012 | Angquist et al. | G11B 27/031 386/278 |
| 2012/0209815 A1* | 8/2012 | Carson et al. | G11B 27/031 707/661 |
| 2012/0209889 A1* | 8/2012 | Agnoli et al. | G11B 27/031 707/803 |
| 2012/0214444 A1 | 8/2012 | McBride et al. | |
| 2012/0218885 A1 | 8/2012 | Abel et al. | |
| 2012/0221789 A1 | 8/2012 | Felter | |
| 2012/0224691 A1 | 9/2012 | Purohit | |
| 2012/0226767 A1 | 9/2012 | Luna et al. | |
| 2012/0233155 A1 | 9/2012 | Gallmeier et al. | |
| 2012/0233205 A1 | 9/2012 | McDermott | |
| 2012/0233543 A1 | 9/2012 | Vagell et al. | |
| 2012/0240061 A1 | 9/2012 | Hillenius et al. | |
| 2012/0240183 A1 | 9/2012 | Sinha | |
| 2012/0257249 A1 | 10/2012 | Natarajan | |
| 2012/0263166 A1 | 10/2012 | Cho et al. | |
| 2012/0266203 A1 | 10/2012 | Elhadad et al. | |
| 2012/0284638 A1 | 11/2012 | Cutler et al. | |
| 2012/0284664 A1 | 11/2012 | Zhao | |
| 2012/0291011 A1 | 11/2012 | Quine | |
| 2012/0296790 A1 | 11/2012 | Robb | |
| 2012/0309540 A1 | 12/2012 | Holme et al. | |
| 2012/0311157 A1 | 12/2012 | Erickson et al. | |
| 2012/0317239 A1 | 12/2012 | Mulder et al. | |
| 2012/0317487 A1 | 12/2012 | Lieb et al. | |
| 2012/0328259 A1 | 12/2012 | Seibert, Jr. et al. | |
| 2012/0331177 A1 | 12/2012 | Jensen | |
| 2012/0331441 A1 | 12/2012 | Adamson | |
| 2013/0007245 A1 | 1/2013 | Malik et al. | |
| 2013/0007471 A1 | 1/2013 | Grab et al. | |
| 2013/0007894 A1 | 1/2013 | Dang et al. | |
| 2013/0013560 A1 | 1/2013 | Goldberg et al. | |
| 2013/0014023 A1* | 1/2013 | Lee | G06Q 10/103 715/751 |
| 2013/0042106 A1 | 2/2013 | Persaud et al. | |
| 2013/0054634 A1 | 2/2013 | Chakraborty et al. | |
| 2013/0055127 A1 | 2/2013 | Saito et al. | |
| 2013/0067232 A1 | 3/2013 | Cheung et al. | |
| 2013/0073403 A1 | 3/2013 | Tuchman et al. | |
| 2013/0073621 A1 | 3/2013 | Waddoups et al. | |
| 2013/0080765 A1 | 3/2013 | Mohanty et al. | |
| 2013/0080919 A1 | 3/2013 | Kiang et al. | |
| 2013/0110565 A1 | 5/2013 | Means, Jr. et al. | |
| 2013/0110961 A1 | 5/2013 | Jadhav | |
| 2013/0117226 A1 | 5/2013 | Jain et al. | |
| 2013/0117337 A1 | 5/2013 | Dunham | |
| 2013/0117376 A1 | 5/2013 | Filman et al. | |
| 2013/0124458 A1 | 5/2013 | Barreto et al. | |
| 2013/0124638 A1 | 5/2013 | Barreto et al. | |
| 2013/0124984 A1 | 5/2013 | Kuspa | |
| 2013/0138608 A1 | 5/2013 | Smith | |
| 2013/0138615 A1 | 5/2013 | Gupta et al. | |
| 2013/0151690 A1 | 6/2013 | Shah et al. | |
| 2013/0159411 A1 | 6/2013 | Bowen | |
| 2013/0163289 A1 | 6/2013 | Kim et al. | |
| 2013/0167253 A1 | 6/2013 | Seleznev et al. | |
| 2013/0179947 A1 | 7/2013 | Kline, III et al. | |
| 2013/0185347 A1 | 7/2013 | Romano | |
| 2013/0185558 A1 | 7/2013 | Seibert et al. | |
| 2013/0191339 A1 | 7/2013 | Haden et al. | |
| 2013/0198600 A1 | 8/2013 | Lockhart et al. | |
| 2013/0212067 A1 | 8/2013 | Piasecki et al. | |
| 2013/0212486 A1 | 8/2013 | Joshi et al. | |
| 2013/0218978 A1 | 8/2013 | Weinstein et al. | |
| 2013/0226876 A1 | 8/2013 | Gati et al. | |
| 2013/0227522 A1 | 8/2013 | Lerum et al. | |
| 2013/0239049 A1 | 9/2013 | Perrodin et al. | |
| 2013/0246901 A1 | 9/2013 | Massand | |
| 2013/0246932 A1 | 9/2013 | Zaveri et al. | |
| 2013/0254699 A1 | 9/2013 | Bashir et al. | |
| 2013/0262210 A1 | 10/2013 | Savage et al. | |
| 2013/0262862 A1 | 10/2013 | Hartley | |
| 2013/0268480 A1 | 10/2013 | Dorman | |
| 2013/0268491 A1 | 10/2013 | Chung et al. | |
| 2013/0268999 A1 | 10/2013 | Kiang et al. | |
| 2013/0275398 A1 | 10/2013 | Dorman et al. | |
| 2013/0275429 A1 | 10/2013 | York et al. | |
| 2013/0275509 A1 | 10/2013 | Micucci et al. | |
| 2013/0282658 A1 | 10/2013 | Besen et al. | |
| 2013/0282830 A1 | 10/2013 | Besen et al. | |
| 2013/0283106 A1 | 10/2013 | King et al. | |
| 2013/0304679 A1 | 11/2013 | Fleming et al. | |
| 2013/0304694 A1 | 11/2013 | Barreto et al. | |
| 2013/0304697 A1 | 11/2013 | Movida | |
| 2013/0305039 A1 | 11/2013 | Gauda | |
| 2013/0325803 A1 | 12/2013 | Akirav et al. | |
| 2013/0326344 A1 | 12/2013 | Masselle et al. | |
| 2014/0006357 A1 | 1/2014 | Davis et al. | |
| 2014/0006465 A1 | 1/2014 | Davis et al. | |
| 2014/0007205 A1 | 1/2014 | Oikonomou | |
| 2014/0013112 A1* | 1/2014 | Cidon | G06F 21/6218 713/165 |
| 2014/0019497 A1* | 1/2014 | Cidon | G06F 17/30194 707/827 |

(56) References Cited

U.S. PATENT DOCUMENTS

| | | | |
|---|---|---|---|
| 2014/0019498 A1* | 1/2014 | Cidon | G06F 17/3007 707/827 |
| 2014/0032489 A1 | 1/2014 | Hebbar et al. | |
| 2014/0032616 A1 | 1/2014 | Nack | |
| 2014/0033277 A1 | 1/2014 | Xiao et al. | |
| 2014/0033291 A1 | 1/2014 | Liu | |
| 2014/0033324 A1 | 1/2014 | Kiang et al. | |
| 2014/0040182 A1 | 2/2014 | Glider et al. | |
| 2014/0040206 A1 | 2/2014 | Ramakrishnan et al. | |
| 2014/0047509 A1 | 2/2014 | Bhogal et al. | |
| 2014/0052939 A1 | 2/2014 | Tseng et al. | |
| 2014/0059002 A1 | 2/2014 | Lockhart et al. | |
| 2014/0059217 A1 | 2/2014 | Pizurica | |
| 2014/0068589 A1 | 3/2014 | Barak | |
| 2014/0074629 A1 | 3/2014 | Rathod | |
| 2014/0082071 A1 | 3/2014 | Rexer | |
| 2014/0150023 A1 | 5/2014 | Gudorf et al. | |
| 2014/0156373 A1 | 6/2014 | Roberts et al. | |
| 2014/0172595 A1 | 6/2014 | Beddow et al. | |
| 2014/0172783 A1 | 6/2014 | Suzuki et al. | |
| 2014/0172799 A1 | 6/2014 | Dorman | |
| 2014/0188798 A1 | 7/2014 | Mackenzie et al. | |
| 2014/0195485 A1 | 7/2014 | Dorman | |
| 2014/0201138 A1 | 7/2014 | Dorman et al. | |
| 2014/0201145 A1 | 7/2014 | Dorman et al. | |
| 2014/0244600 A1 | 8/2014 | Schmidt et al. | |
| 2014/0280605 A1 | 9/2014 | Zhang | |
| 2014/0337291 A1 | 11/2014 | Dorman et al. | |
| 2014/0337491 A1 | 11/2014 | Barreto et al. | |
| 2014/0359286 A1 | 12/2014 | Wen et al. | |
| 2014/0372376 A1 | 12/2014 | Smith et al. | |
| 2014/0379647 A1 | 12/2014 | Smith et al. | |
| 2015/0019723 A1 | 1/2015 | Kweon et al. | |
| 2015/0039556 A1 | 2/2015 | Mackenzie et al. | |
| 2015/0186668 A1 | 7/2015 | Whaley et al. | |
| 2015/0237406 A1 | 8/2015 | Ochoa et al. | |
| 2015/0339113 A1 | 11/2015 | Dorman et al. | |
| 2016/0065672 A1 | 3/2016 | Savage et al. | |

FOREIGN PATENT DOCUMENTS

| | | | |
|---|---|---|---|
| CN | 102264063 A | 11/2011 | |
| EP | 0348614 A2 | 1/1990 | |
| EP | 0348614 A2 | 1/1990 | |
| EP | 0921661 A2 | 6/1999 | |
| EP | 1349088 | 10/2003 | |
| EP | 1528746 A2 | 5/2005 | |
| EP | 1933242 A1 | 6/2008 | |
| EP | 1933242 A1 | 6/2008 | |
| EP | 2372574 A1 | 10/2011 | |
| EP | 2610776 A2 | 7/2013 | |
| GB | 2453924 A | 4/2009 | |
| GB | 2471282 A | 12/2010 | |
| JP | 09-101937 | 4/1997 | |
| JP | 11-025059 | 1/1999 | |
| JP | 2003273912 A | 9/2003 | |
| JP | 2004310272 A | 11/2004 | |
| JP | 09-269925 | 10/2007 | |
| JP | 2008250944 | 10/2008 | |
| KR | 20020017444 A | 3/2002 | |
| KR | 20040028036 | 4/2004 | |
| KR | 20050017674 A | 2/2005 | |
| KR | 20060070306 A | 6/2006 | |
| KR | 20060114871 A | 11/2006 | |
| KR | 20100118836 A | 11/2010 | |
| KR | 20110074096 A | 6/2011 | |
| KR | 20110076831 A | 7/2011 | |
| WO | WO-0007104 A1 | 2/2000 | |
| WO | WO-0219128 A1 | 3/2002 | |
| WO | WO-2004097681 A1 | 11/2004 | |
| WO | WO-2006028850 A2 | 3/2006 | |
| WO | WO-2007024438 A1 | 3/2007 | |
| WO | 2007113573 A2 | 10/2007 | |
| WO | WO-2007113573 A2 | 10/2007 | |
| WO | WO-2008011142 A2 | 1/2008 | |
| WO | WO-2008076520 A2 | 6/2008 | |
| WO | WO-2011109416 A2 | 9/2011 | |
| WO | WO-2012167272 A1 | 12/2012 | |
| WO | WO-2013009328 A2 | 1/2013 | |
| WO | WO-2013013217 A1 | 1/2013 | |
| WO | WO-2013041763 A1 | 3/2013 | |
| WO | WO-2013166520 | 11/2013 | |

OTHER PUBLICATIONS

International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/056472 mailed on Jun. 22, 2012, pp. 1-12.
International Search Report and Written Opinion for PCT/US2011/060875 Mailed Oct. 30, 2012, pp. 1-10.
Langfeld L. et al., "Microsoft SharePoint 2003 Unleashed," Chapters 11 and 15, Jun. 2004, pp. 403-404, 557-561, 578-581.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
"Understanding Metadata," National Information Standards Organization, NISO Press, 2004, 20 pages.
International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
International Search Report and Written Opinion for PCT/US2010/070366, Applicant: Box, Inc., Mailed Mar. 24, 2013, 10 pages.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.

(56) References Cited

OTHER PUBLICATIONS

Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 13 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 23, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 6 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/034765, Applicant: Box, Inc., Mailed Jan. 20, 2014, 15 pages.
International Search Report and Written Opinion for PCT/US2013/035404, Applicant: Box, Inc., Mailed Jun. 26, 2013, 11 pages.
International Search Report and Written Opinion for PCT/US2013/039782, Applicant: Box, Inc., Mailed Aug. 28, 2013, 15 pages.
Patent Court Document of Approved Judgment for GB0602349.3 and GB0623571.7; Mar. 3, 2009, 17 pages.
Exam Report for EP13185269.1, Applicant: Box, Inc. Mailed Jan. 28, 7 pages.
"Average Conversion Time for a D60 Raw file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
John et al., "Always Sync Support Forums—View topic—Allway sync funny behavior," Allway Sync Support Forum at http://sync-center.com, Mar. 28, 2011, XP055109680, 2 pages.
Search Report for EP 11729851.3, Applicant: Box, Inc. Mailed Feb. 7, 2014, 9 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web.Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet http://www.pcmag.com, Sep. 28, 2012, 7 pages.
Exam Report for EP13177108.1, Applicant: Box, Inc. Mailed May 26, 2014, 6 pages.
Exam Report for GB1318792.7, Applicant: Box, Inc. Mailed May 22, 2014, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the Internet: http://blogs.technet.com, 3 pages.
Rao, "Box Acquires Crocodoc to Add HTML.5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Sommerer, "Presentable Document Format: Improved On-demand PDF to HTML Conversion," retrieved from the internet, http://research.microsoft.com, Nov. 2004, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1410569.6 Applicant: Box, Inc. Mailed Jul. 11, 2014, 9 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.

(56) References Cited

OTHER PUBLICATIONS

Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc, Mailed Feb. 17, 2015, 5 pages.
Exam Report for EP 13185269.1, Applicant: Box, Inc. Mailed Feb. 13, 2015, 8 pages.
"Dropbox: Sync only specific folders," posted on Feb. 9, 2012, available online at http://www.tech-recipes.com/rx/20865/dropbox-sync-only-specific-folders/, 4 pages.
Exam Report for GB1220644.7 Applicant: Box, Inc. Mailed May 1, 2015, 4 pages.
Invens, "Using and Troubleshooting Offline Files," Jun. 23, 2002, Windows IT Pro, pp. 1-5.
Invens, "Using and Troubleshooting Offline Files," Jun. 23, 2002, Windows IT Pro, Figures 1 and 2, 2 pages.
"How-to Geek, How to Sync Specific Folders With Dropbox," originally written on Jun. 20, 2010 and archived version retrieved from WaybackMachine as published online on Jun. 4, 2010 at http://www.howtogeek.com/howto/18285/sync-specific-folders-with-dropbox, 7 pages.
Ivens, "Using and Troubleshooting Offline Files," Jun. 23, 2002, Windows IT Pro, Figure 1.
Ivens, "Configuring Offline Files," Apr. 21, 2002, Windows IT Pro, pp. 1-5.
Exam Report for GB1316532.9 Applicant: Box, Inc. Mailed Mar. 27, 2015, 6 pages.
Burney, "How to Move Document from Your Computer to Your iPad and Back Again," May 31, 2011, 3 pages.
Exam Report for GB1311459.0 Applicant: Box, Inc. Mailed Aug. 19, 2013, 6 pages.

Exam Report for GB1413461.3; Applicant: Box, Inc. Mailed Aug. 21, 2015, 6 pages.
Fu et al., Efficient and Fine-Grained Sharing of Encrypted Files, Quality of Service (IWQos), 2010 18th International Workshop on year 2010, pp. 1-2.
Exam Report for GB1316532.9; Applicant: Box, Inc., Mailed Mar. 8, 2016, 3 pages.
U.S. Appl. No. 61/505,999, filed Jul. 11, 2011 Desktop Application for Access and Interaction with Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/564,425, filed Nov. 29, 2011 Mobile Platform Folder Synchronization and Offline Synchronization.
U.S. Appl. No. 61/568,430, filed Dec. 8, 2011 Mobile Platform File and Folder Selection Functionalities For Offline Access and Synchronization.
U.S. Appl. No. 13/689,544, filed Nov. 29, 2012 Mobile Platform File and Folder Selection Functionalities for Offline Access and Synchronization.
U.S. Appl. No. 61/560,685, filed Nov. 16, 2011 Temporal and Spatial Processing and Tracking of Events in a Web-Based Collaboration Environment for Asynchronous Delivery in an Ordered Fashion.
U.S. Appl. No. 13/524,501, filed Jun. 15, 2012 Resource Effective Incremental Updating of a Remote Client With Events Which Occurred via a Cloud-Enabled Platform.
U.S. Appl. No. 13/526,437, filed Jun. 18, 2012 Managing Updates at Clients Used by a User to Access a Cloud-Based Collaboration Service.
U.S. Appl. No. 14/658,423, filed Mar. 16, 2015 Managing Updates at Clients Used by a User to Access a Cloud-Based Collaboration Service.
U.S. Appl. No. 61/620,554, filed Apr. 5, 2012 Device Pinning Capability for Enterprise Cloud Service and Storage Accounts.
U.S. Appl. No. 13/493,922, filed Jun. 11, 2012 Device Pinning Capability for Enterprise Cloud Service and Storage Accounts.
U.S. Appl. No. 61/622,868, filed Apr. 11, 2012 Web and Desktop Client Synchronization of Mac Packages With a Cloud-Based Platform.
U.S. Appl. No. 61/643,116, filed May 4, 2012 Hbase Redundancy Implementation for Action Log Framework.
U.S. Appl. No. 13/890,172, filed May 8, 2013 Repository Redundancy Implementation of a System Which Incrementally Updates Clients With Events That Occurred via a Cloud-Enabled Platform.
U.S. Appl. No. 13/888,308, filed May 6, 2013 Repository Redundancy Implementation of a System Which Incrementally Updates Clients With Events That Occurred via a Cloud-Enabled Platform.
U.S. Appl. No. 61/693,521, filed Aug. 27, 2012 Backend Implementaion of Synchronization Client Selective Subfolder Syncing in a Cloud-Based Environment.
U.S. Appl. No. 14/010,851, filed Aug. 27, 2013 Server Side Techniques for Reducing Database Workload in Implementing Selective Subfolder Synchronization in a Cloud-Based Environment.
U.S. Appl. No. 61/751,578, filed Jan. 11, 2013 Functionalities, Features, and User Interface of a Synchronization Client to a Cloud-Based Environment.
U.S. Appl. No. 14/153,726, filed Jan. 13, 2014 Functionalities, Features, and User Interface of a Synchronization Client to a Cloud-Based Environment.
U.S. Appl. No. 61/750,474, filed Jan. 9, 2013 File System Event Monitor and Event Filter Pipeline for a Cloud-Based Platform.
U.S. Appl. No. 14/149,586, filed Jan. 7, 2014 File System Monitoring in a System Which Incrementally Updates Clients With Events That Occurred in a Cloud-Based Collaboration Platform.
U.S. Appl. No. 61/753,761 Conflict Resolution, Retry Condition Management, and Handling of Problem Files for the Synchronization Client to a Cloud-Based Platform.

(56) References Cited

OTHER PUBLICATIONS

U.S. Appl. No. 14/158,626 Conflict Resolution, Retry Condition Management, and Handling of Problem Files for the Synchronization Client to a Cloud-Based Platform.
U.S. Appl. No. 61/739,296, filed Dec. 19, 2012 Synchronization of Read-Only Files/Folders by a Synchronization Client With a Cloud-Based Platform.
U.S. Appl. No. 14/135,311, filed Dec. 19, 2013 Method and Apparatus for Synchronization of Items With Read-Only Permissions in a Cloud-Based Environment.
U.S. Appl. No. 61/748,399, filed Jan. 2, 2013 Handling Action Log Framework Race Conditions for a Synchronization Client to a Cloud-Based Environment.
U.S. Appl. No. 14/146,658, filed Jan. 2, 2014 Race Conditon Handling in a System Which Incrementally Updates Clients With Events That Occurred in a Cloud-Based Collaboration Platform.
U.S. Appl. No. 61/822,170, filed May 10, 2013 Identification and Handling of Items to Be Ignored for Synchronization With a Cloud-Based Platform by a Synchronization Client.
U.S. Appl. No. 14/275,890, filed May 13, 2014 Identification and Handling of Items to Be Ignored for Synchronization With a Cloud-Based Platform by a Synchronization Client.
U.S. Appl. No. 61/822,191, filed May 10, 2013 Systems and Methods for Depicting Item Synchronization With a Cloud-Based Platform by a Synchronization Client.
U.S. Appl. No. 14/275,401, filed May 12, 2014 Top Down Delete or Unsynchronization on Delete of and Depiction of Item Synchronization With a Synchronization Client to a Cloud-Based Platform.
U.S. Appl. No. 61/834,756, filed Jun. 13, 2013 Systems and Methods for Event Building, Collapsing, or Monitoring by a Synchronization Client of a Cloud-Based Platform.
U.S. Appl. No. 14/304,038, filed Jun. 13, 2014 Systems and Methods for Synchronization Event Building and/or Collapsing by a Synchronization Component of a Cloud-Based Platform.
U.S. Appl. No. 61/838,176, filed Jun. 21, 2013 Maintaining and Updating File System Shadows on a Local Device by a Synchronization Client of a Cloud-Based Platform.
U.S. Appl. No. 14/312,482, filed Jun. 23, 2014 Maintaining and Updating File System Shadows on a Local Device by a Synchronization Client of a Cloud-Based Platform.
U.S. Appl. No. 61/860,050, filed Jul. 30, 2013 Scalability Improvement in a System Which Incrementally Updates Clients With Events That Occurred in a Cloud-Based Collaboration Platform.
U.S. Appl. No. 14/194,091, filed Feb. 28, 2014 Scalability Improvement in a System Which Incrementally Updates Clients With Events That Occurred in a Cloud-Based Collaboration Platform.
Cicnavi, "Offline Files in XP," Nov. 29, 2010, UtilizeWindows, pp. 1-6.

* cited by examiner

| Example Features & Functionalities 800 |
| --- |
| If you add a package via Mac Sync, it will appear on another Mac machine verbatim |
| The package will appear as a file from the web application |
| If you change the content from a Mac, the package will be created as a new version on the web application |
| If you make a conflicting edit (note - could be two different files within the package), Sync knows that it's a conflict |
| Syncing to a PC does not cause the package flag to get stomped on |
| Package does not get folder actions on the web application (e.g. option to Sync w/ subfolder sync) |
| It is possible to do all file actions on a package - just like any other file (e.g. lock/unlock, tasks, comments, etc.) |
| The package can be downloaded as a package on a Mac from the web application |
| The package can be uploaded to the web application from a Mac |
| Omnigraffle, iWork, etc. package preview from web application |

*FIG. 8*

CLOUD SERVICE ENABLED TO HANDLE A SET OF FILES DEPICTED TO A USER AS A SINGLE FILE IN A NATIVE OPERATING SYSTEM

CROSS-REFERENCE TO RELATED APPLICATIONS

This application claims the benefit of U.S. Provisional Patent Application No. 61/622,868 entitled "Web and Desktop Client Synchronization of MAC Packages With A Cloud-based Platform", which was filed on Apr. 11, 2012, the contents of which are all incorporated by reference herein.

BACKGROUND

When some applications save files, they do not save each file as an individual file. Instead, these applications might save multiple files of varying formats (e.g., documents, PDFs, Powerpoints, diagrams, images, audio, video, etc.) as an entire folder structure, and identify to the platform or operating system in which it is used, that the file, while appearing to the user as a single file, actually contains multiple files or folders.

This behavior may be application specific and/or operating system specific. For example, MAC shops heavily use "packages," which are technically folders that have a flag such that they appear like a file to users in the user interface on MAC devices. Specifically, MAC applications including Omnigraffle & iWork save files as packages, and in general, MAC applications are themselves stored as packages. However, outside of the native operating system or platform where a flag which indicates that a given represented file actually includes folders and/or multiple files, errors and unexpected behavior can occur and negatively impact user experience or cause data corruption.

BRIEF DESCRIPTION OF THE DRAWINGS

FIG. 8 depicts a table illustrating example user actions which can be performed when using the cloud service which handles packages or sets of files that a user would typically locally view and access as a single file (e.g., a MAC Package).

DETAILED DESCRIPTION

Figure 1:
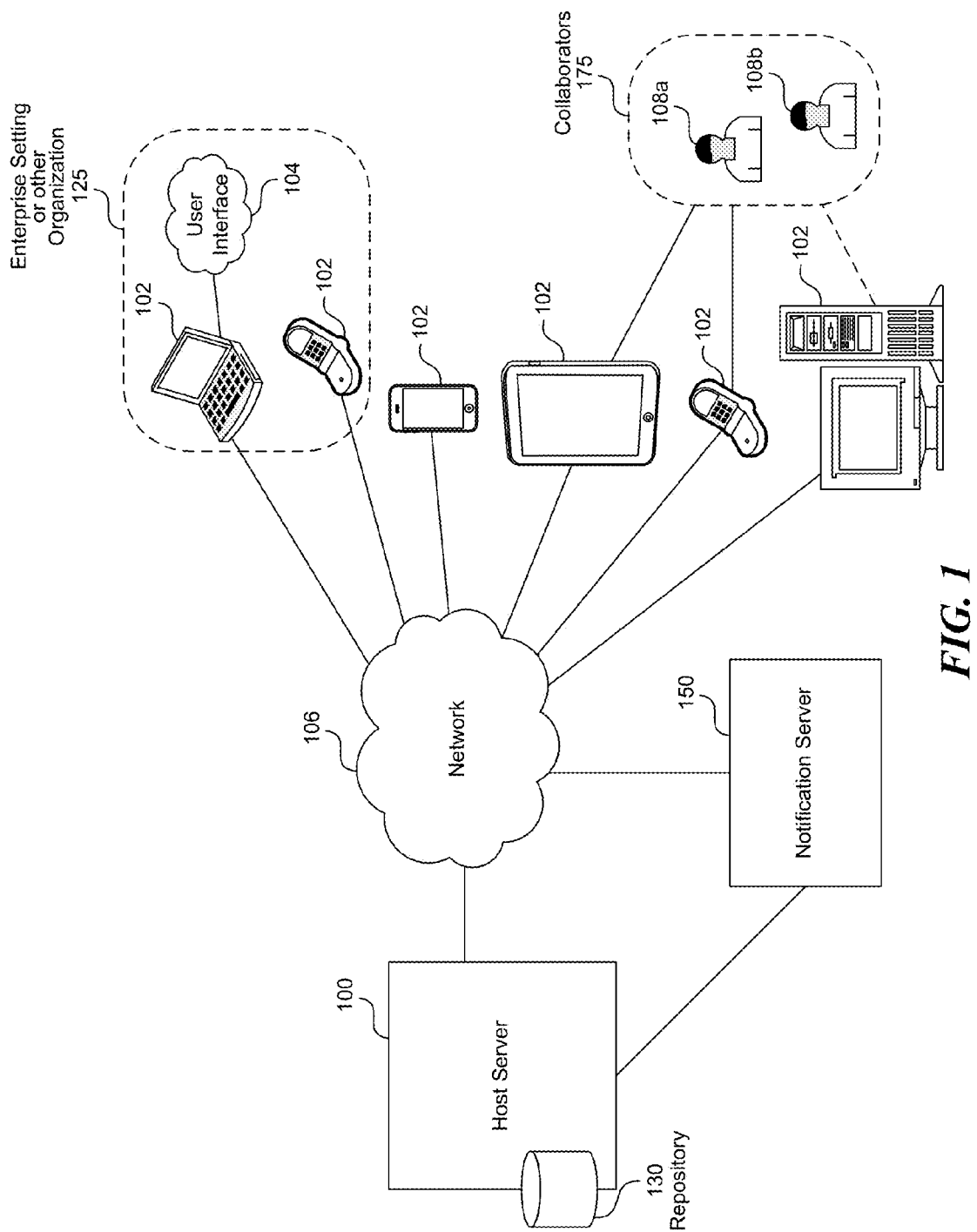
FIG. 1 illustrates an example diagram of a system having a host server of a cloud service and/or cloud storage accounts enabled to handle a set of files depicted to a user as a single file in a native operating system.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for enabling a cloud service or a cloud based service to handle a set of files depicted to a user as a single file in a native operating system.

FIG. 1 illustrates an example diagram of a system having a host server 100 of a cloud service and/or cloud storage accounts enabled to handle a set of files depicted to a user as a single file in a native operating system.

The client devices 102 can be any system and/or device, and/or any combination of devices/systems that is able to establish a connection, including wired, wireless, broadband, cellular connections, near field wireless, with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a BLACKBERRY device, a TREO, a handheld tablet (e.g. an IPAD, a GALAXY, XOOM Tablet, etc.), a tablet PC, a thin-client, a hand held console, a hand held gaming device or console, an IPHONE, a head mountable device, and/or any other portable, mobile, hand held devices, etc. running on any platform or any operating system (e.g., MAC-based OS (OS X, iOS, etc.), WINDOWS-based OS (WINDOWS MOBILE, WINDOWS 7, etc.), ANDROID, BLACKBERRY OS, Embedded LINUX platforms, Palm OS, SYMBIAN platform. In one embodiment, the client devices 102 and the host server 100, are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators 175 (e.g., collaborators 108a, 108b) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., PowerPoint slides), images, audio files, multimedia content, web pages, blogs, posts, tweets, comments, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators 175 (e.g., collaborators 108a, 108b) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
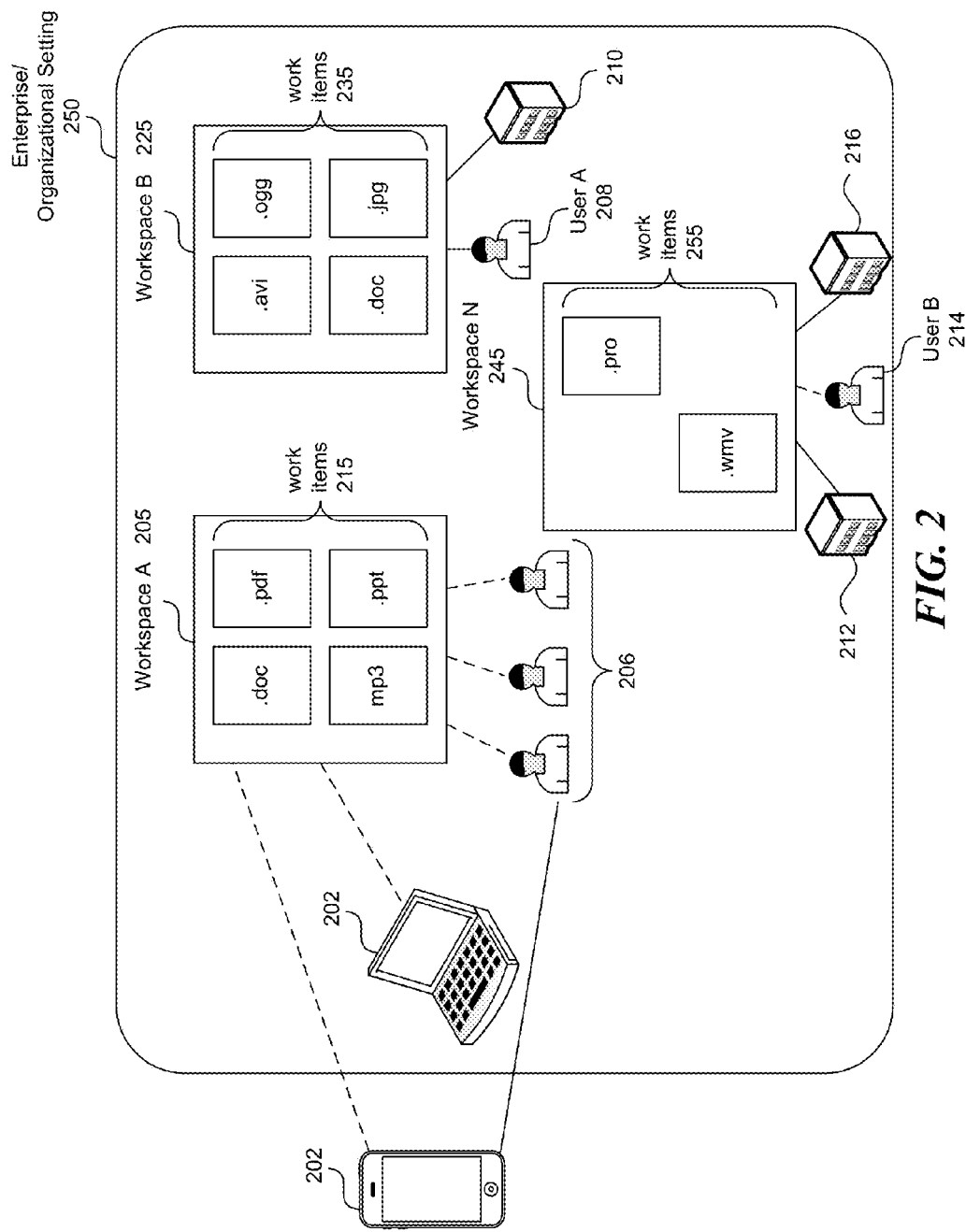
FIG. 2 depicts a diagram of a web-based or online collaboration platform deployed in an enterprise or other organizational setting for organizing work items and workspaces, as one example of a hosted cloud service and/or cloud storage enabled to handle a set of files depicted to a user as a single file in a native operating system.

A diagrammatic illustration of a web-based or online collaboration platform deployed in an enterprise or other organizational setting 125 and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of cloud-based services and/or cloud storage such as an online or web-based collaboration environment is able to handle a set of files depicted to a user as a single file in an operating system in a user intuitive manner.

Figure 5:
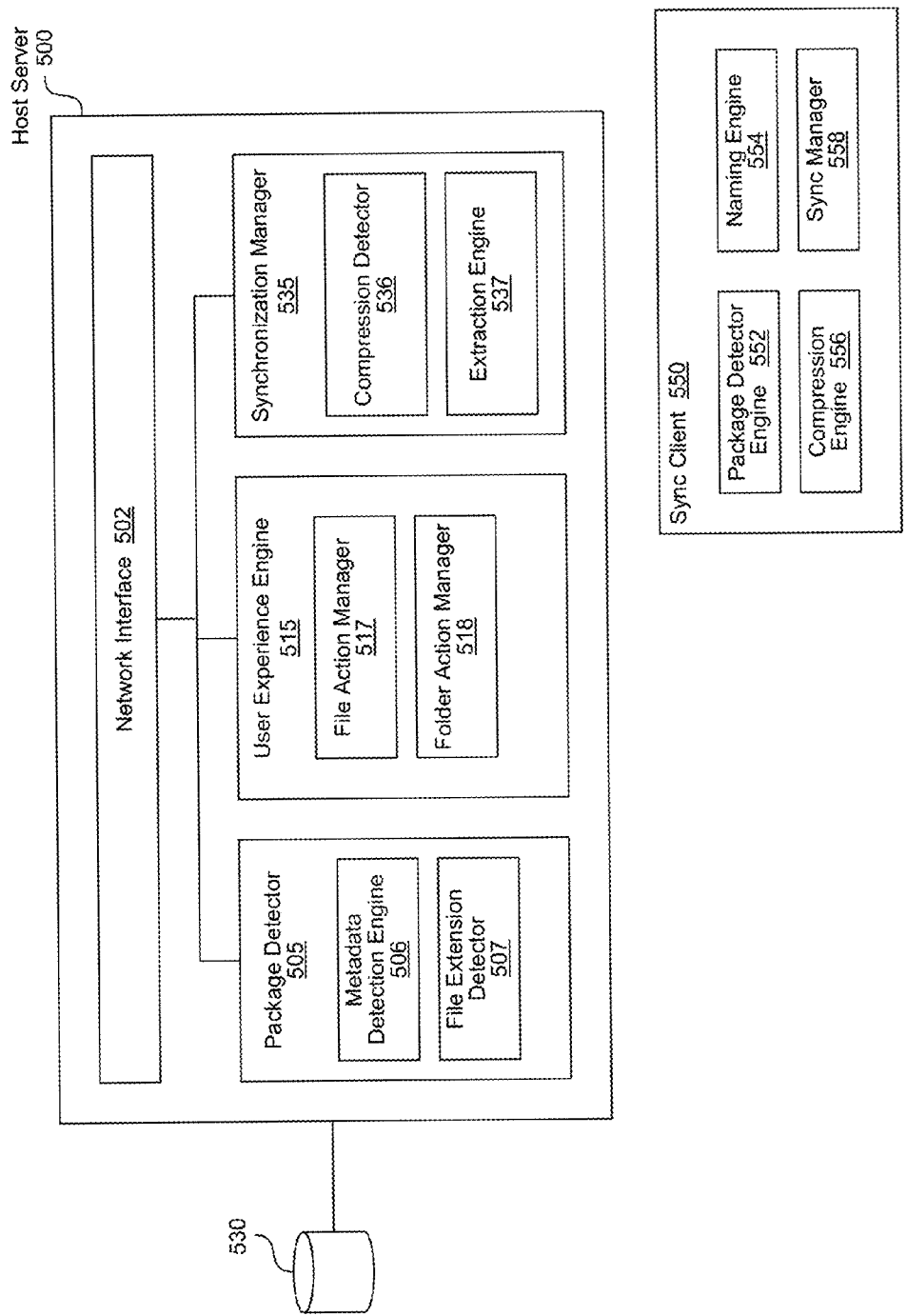
FIG. 5 depicts a block diagram illustrating an example of components in a host server for cloud-based services and storage accounts enabled to handle a set of files depicted to a user as a single file in a native operating system.

Functions and techniques disclosed for a cloud service or cloud storage/file sharing system enabling file actions to be performed on a file representing a folder structure in the user hosted by server 100 are illustrated further in the example of FIG. 5. Functions and techniques performed by the host server 100 and/or other related components therein are described, respectively, in detail with further reference to the example flow charts of FIG. 6-8.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts a diagram of a web-based or online collaboration platform deployed in an enterprise or other organizational setting 250 for organizing work items 215, 235, 255 and workspaces 205, 225, 245, as one example of a hosted cloud service and/or cloud storage enabled to handle a set of files depicted to a user as a single file in a native operating system of a client device 202.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface (e.g., user interface 104 in FIG. 1) to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
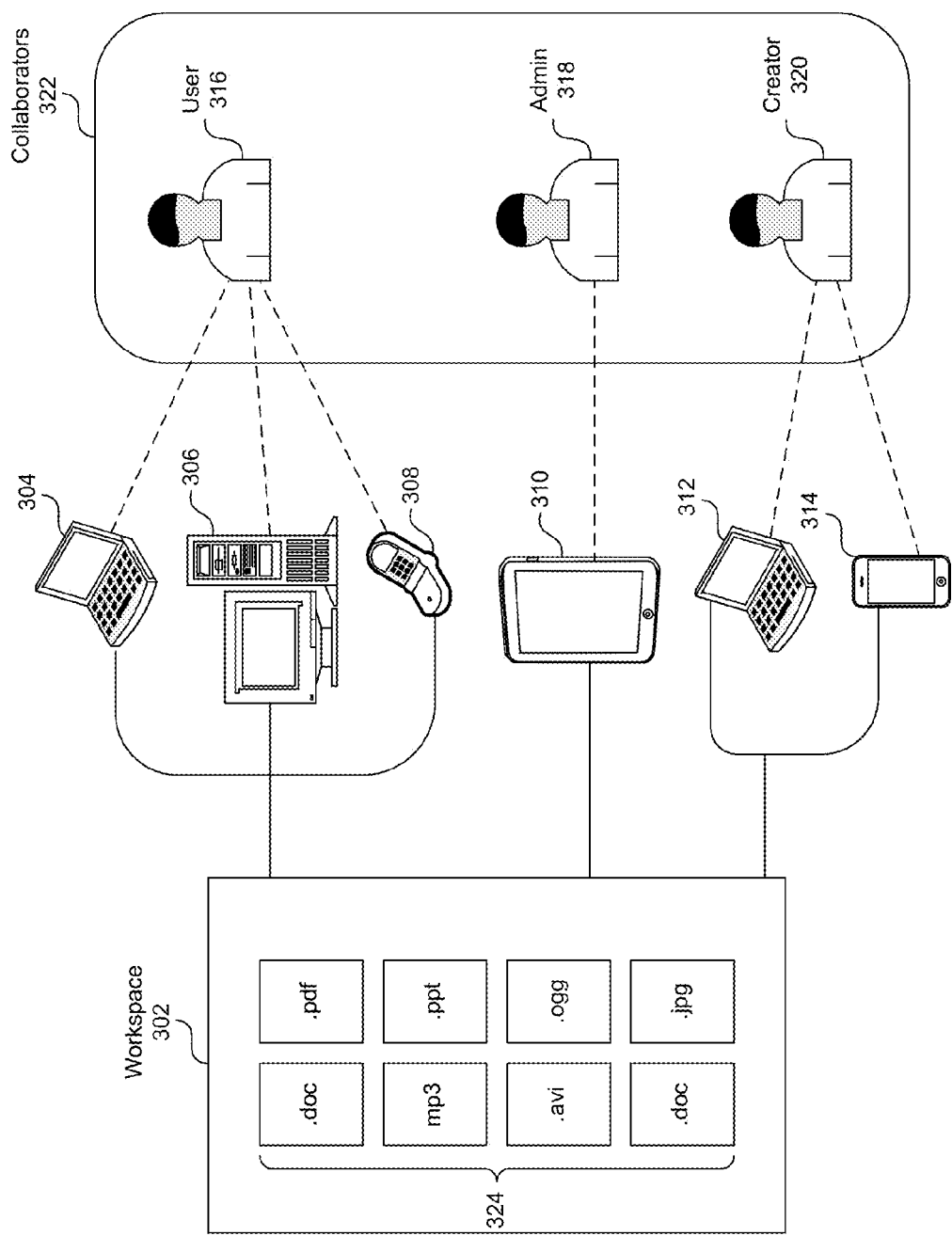
FIG. 3 depicts an example diagram of a workspace in an online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices (client devices 304, 306, 308, 310, 312 and 314) authorized to access the work space.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302 in accordance with the platform and/or application independent mechanisms. Users can also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Figure 4A:
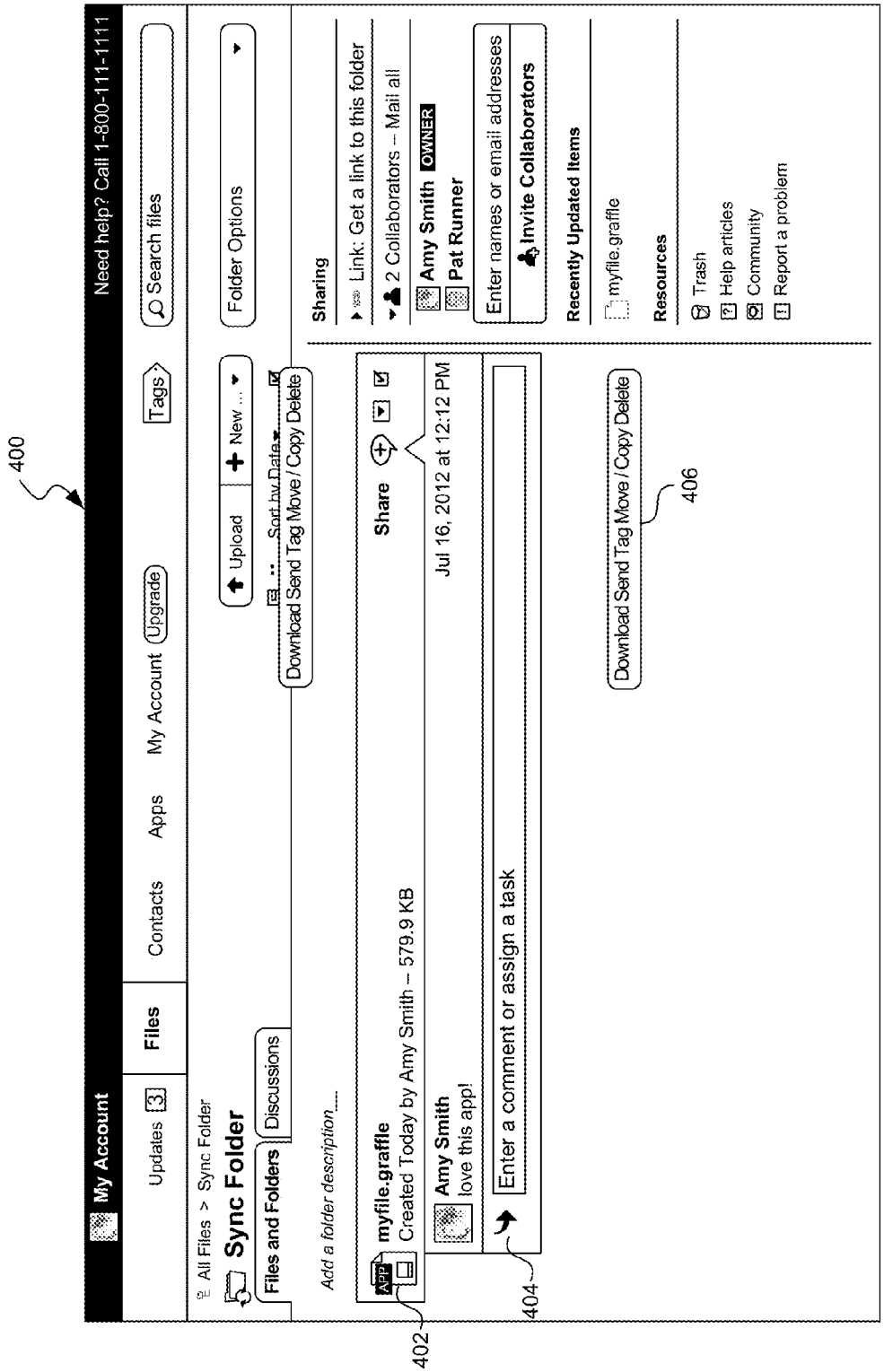
FIG. 4A depicts an example screenshot of a user interface to a cloud service where a packaged file or a file containing multiple folders and/or multiple files is represented as a single file, and the file based actions which can be performed on the package containing multiple folders/files represented as the single file.

FIG. 4A depicts an example screenshot of a user interface 400 to a cloud service where a packaged file or a file containing multiple folders and/or multiple files is represented as a single file 402, and the file based actions 406 which can be performed on the package containing multiple folders/files represented as the single file.

Figure 4B:
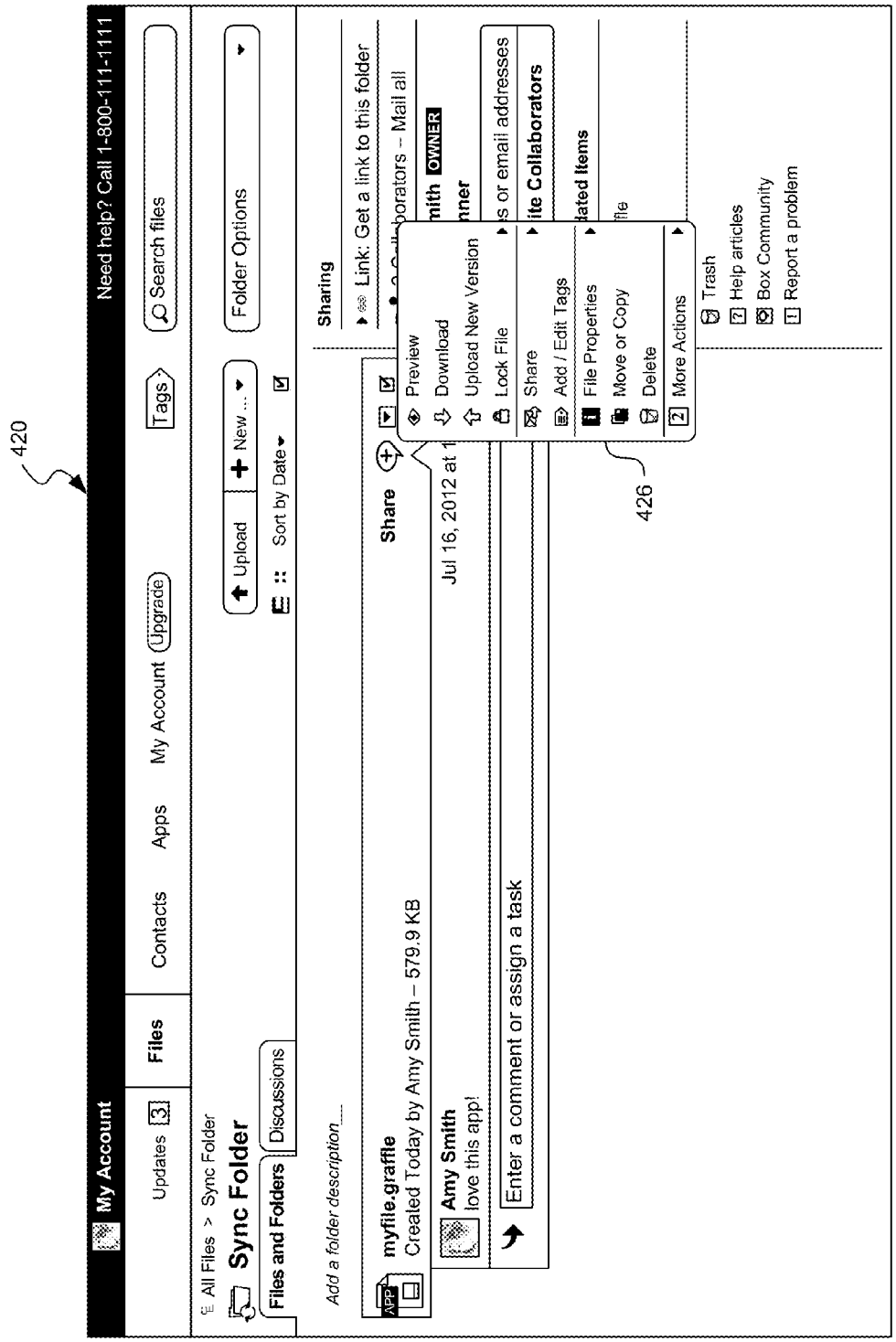
FIG. 4B depicts an example screenshot of a user interface to a cloud service showing additional file-based actions which can be performed on the package containing multiple folders/files represented as the single file.

For example, one of the collaborators "Amy Smith" is able to comment 404 on the single file 402 as a file-type action, even though "myfile.graffle" is a package in its original or native operating system (e.g., MAC) as containing multiple files/folders. Additional file-based actions 406 include the ability for a user or collaborator (e.g., collaborator "Pat Runner") to download, send, tag, move, copy, or delete the packaged file "myfile.graffle" as a single file in the cloud service through the user interface 400. FIG. 4B depicts another example screenshot of a user interface 420 to a cloud service showing additional file-based actions 426 which can be performed on the package containing multiple folders/files represented as the single file. These actions 426 can include by way of example, preview, download, upload, lock, share, add/edit tags, view file properties, move or copy the file, delete the file, etc.

Figure 4C:
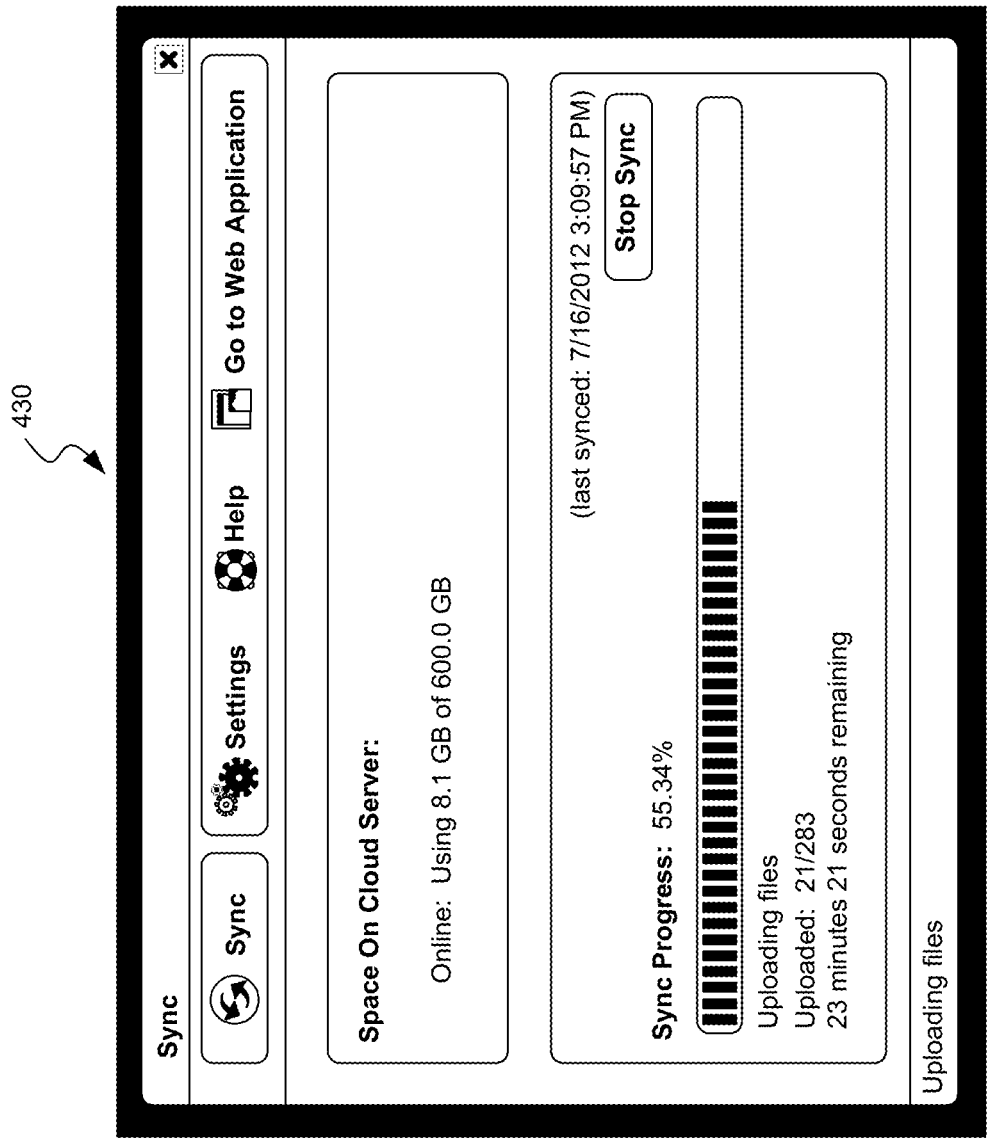
FIG. 4C depicts an example screenshot of a user interface to a desktop or mobile client on a device able to process a set of files or a package on the device, for the cloud service to detect the set of files for presentation in the web interface to the cloud service as a user would expect (e.g., as a single file or package as depicted in the original or "native" operating system).

FIG. 4C depicts an example screenshot of a user interface 430 to a desktop or mobile client on a device (e.g., laptop, mobile, portable, Smart phone, tablet, net book, etc.) able to process a set of files or a package on the device, for the cloud service to detect the set of files for presentation in the web interface to the cloud service as a user would expect (e.g., as a single file or package as depicted in the original or "native" operating system).

Figure 4D:
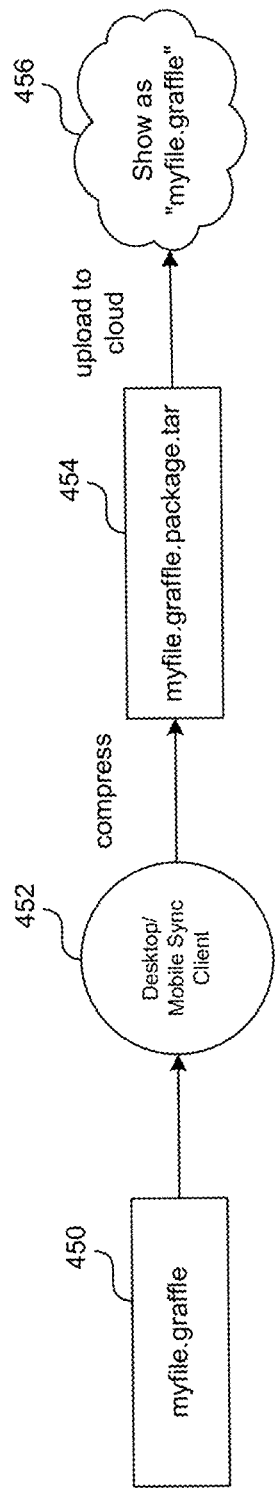
FIG. 4D depicts an example flow of how a MAC package is processed by the corresponding desktop or mobile sync client of a cloud service for the MAC package to be used and accessed via the cloud service by different users, devices, and/or platforms/operating systems.

FIG. 4D depicts an example flow of how a MAC package 450 is processed by the corresponding desktop or mobile sync client 452 or other agent/module of a cloud service 456 for the MAC package to be used and accessed via the cloud service 456 by different users, devices, and/or platforms/operating systems.

The cloud 456 server can store the set of files or packages as compressed files (e.g., tar files) as opposed to a folder structure (e.g., in the repository 530 of FIG. 5). This format corresponds to a user's mental model of these files as documents that are atomic and preserves the user experience and user's expectations when working with these files.

When accessed via the cloud 456 (as hosted by server 500 shown in the example of FIG. 5), all file operations can be used normally (commenting, versioning, sharing, open box file actions, etc. as facilitated by the user experience engine 515, or the file action manager 517 and/or the folder action manager 518). The compressed file (TAR file) can use a file extension (e.g., ".package.tar") (e.g., appended by the sync client 550 or its naming engine 554) to the original file name or other file identifier such that the cloud environment 456 hosted by the server 500 can uniquely identify packages (e.g. "myfile.graffle.package.tar 454"), for example, via the package detector 505. For example, a package can be identified via the metadata (e.g., a flag bit) set by the native operating system (e.g., via the metadata detection engine 506) or by a file extension (e.g., via the file extension detector 507).

The compressed file 454 typically now includes a single folder inside it that is the original package (e.g. "myfile.graffle 450"). In general, this is a folder that has the metadata or the "package bit" set (which the selected compression mechanism, in this case TAR preserves). When a user downloads a package from the cloud environment 456 using a native browser (e.g., native OS to the file 450), in this case, a MAC browser, the user can obtain or access the .package.tar file, which can then be extracted to obtain the original uncompressed package file 450. In addition, a user can upload a new package file directly through the web interface to the cloud 456.

Users can also move or rename a package and re-upload it to the cloud environment 456 via the server 500. For example, a sync client 452 can process packages as follows: on download, the sync client 452 (or shown in the example of FIG. 5 as sync client 550) can expand the compressed file (e.g., the tar file 454) and store the package into the files system. On upload, the sync client 452 can compress (e.g., tar) the package (e.g., by the compression engine 556) and compress the file again when any file inside the package changes. For example, the package detector engine 552 can detect packages that require compression and/or packages that have changed content and require compression. The sync client 550 can also calculate and store the a hash value (e.g., the SHA-1) of the compressed file 454. In general, no new APIs or parameters are needed for this implementation. In one embodiment, the sync client 452 for a MAC operating system can perform local operations on the package (move, rename, delete) as if it were a file.

The sync client 550, which may be for a different operating system (non-native to the file 450), such as a sync client for Windows can also perform similar processes on packages. Alternatively, they may remain as flat files. Users can open the compressed (e.g., TAR) file, in the non-native operating system/platform, if needed.

The web application for the cloud service 456 to access packages can implement additional enhancements. For example, the file extension (e.g., .package.tar extension) can be hidden from the user in the user interface. The system can also prevent users from renaming files to ".package.tar" to avoid confusion or other compatibility issues. Note that sync clients for mobile devices such as the iPhone, iPad, or Android devices, or other mobile platforms can be configured to perform the same steps to facilitate file actions to be performed on a file representing a folder structure via the cloud-based service.

FIG. 5 depicts a block diagram illustrating an example of components in a host server 500, as described above, for cloud-based services and storage accounts enabled to handle a set of files depicted to a user as a single file in a native operating system and an example of the components of a sync client 550 able to process and prepare a set of files (e.g., a package) for the host server 500 to properly manage.

The host server 500, in one embodiment, hosts a cloud based service and/or cloud based storage service which can include cloud based collaboration and/or file sharing platform. The host server 500 can include, for example, a network interface 502, a package detector 505 having a metadata detection engine 506 and/or a file extension detector 507, a user experience engine having a file action manager 517 and/or a folder action manager 518, and/or a synchronization manager 535 having a compression detector and/or an extraction engine 537. The sync client 550 can include a package detector engine 551, a naming engine 554, a compression engine 556, and/or a sync manager 558. Additional or less components/modules/engines can be included in the host server 500, the sync client 550 and each illustrated component.

The network interface 502 can be a networking module that enables the host server 500 to mediate data in a network with an entity that is external to the host server 500, through any known and/or convenient communications protocol supported by the host and the external entity. The network interface 502 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," "a handler," a "detector," an "interface," a "processor," a "tracker," a "detector," a "generator," a "launcher," a "selector," an "updator," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

Figure 6:
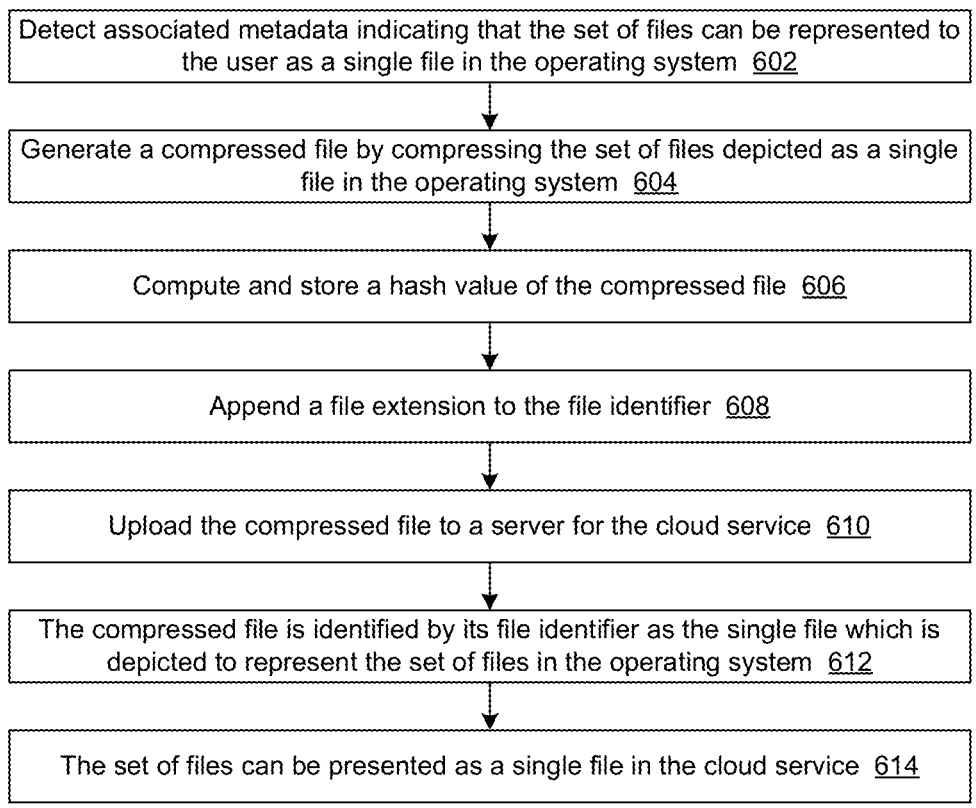
FIG. 6 depicts a flow chart illustrating example process flows for compressing and formatting a set of files or a package to enable cloud service to handle a set of files depicted to a user as a single file in an operating system in a user intuitive manner.

FIG. 6 depicts a flow chart illustrating example process flows for compressing and formatting a set of files or a package to enable a cloud service to handle a set of files depicted to a user as a single file in an operating system in a user intuitive manner.

In process 602, associated metadata indicating that the set of files can be represented to the user as a single file in the operating system is detected. In some instances, the set of files can include folders or a folder structure which includes a hierarchy of folders. The set of files or the folder structure can include, by way of further example, an application installation file, multiple files of same or different formats, system files, user files, unstructured data or structured data, for any operating system including data for MAC, iOS, Android, Windows or Windows mobile operating systems.

In process 604, a compressed file is generated by compressing the set of files depicted as a single file in the operating system, for example, responsive to detecting associated metadata indicating that the set of files can be represented to the user as a single file in the operating system via a user interface. In one embodiment, a compressed format of the compressed file preserves the associated metadata. For example, a TAR compression of MAC package files preserve the metadata (e.g., a flag bit in MAC OS) which indicates that the package actually includes mutliiple files and/or folders, even though it is shown in the user interface or other wise appears to the user as being a single file.

In one embodiment, the compressed file is generated by a desktop or mobile client of the cloud service (e.g., a desktop or mobile synchronization client). In some instances, the user, via the desktop or mobile client is able to perform file actions on the set of files as if it were a single file, regardless of the operating system or platform on which the desktop of mobile client is running.

In process 606, a hash value of the compressed file is computed and stored. The hash value can be stored to help identify or determine when changes happen (e.g. if the file changes on server, the system knows to re-download if hash changes. In the event of local changes, this can be detected from a change in the compressed hash and can indicate the need to upload to the server.

In process 608, a file extension is appended to a file identifier (e.g., a file name). In process 610, the compressed file is uploaded to a server for the cloud service. In process 612, the compressed file is identified (e.g., by the cloud server) by its file identifier (e.g., its filename) as the single file which is depicted to represent the set of files in the operating system. In one embodiment, the file extension can be detectable by the server for the cloud service that the compressed file includes the set of files depicted as the single file in the operating system.

In process 614, the set of files can be presented as a single file in the cloud service. Further, in the cloud service, file actions can be performed on the set of files as if it were a single file via a web interface to the cloud service, which can be independent of the operating system on which the cloud service is accessed. For example, a PC-user accessing a package of files that is created in a different operating system or by an application native to a different operating system (e.g., MAC-based application, or an application/set of files created in MAC, iOS or another non-Windows based operating system), can perform file type actions on the set of files or package via the cloud.

File actions can typically include, by way of example, lock/unlock, download, and comment on the file. File actions can also include, one or more of, assign the file or represented folder structure as or in a task, preview of the folder structure or the associated content by acting on the file used for representation.

Figure 7:
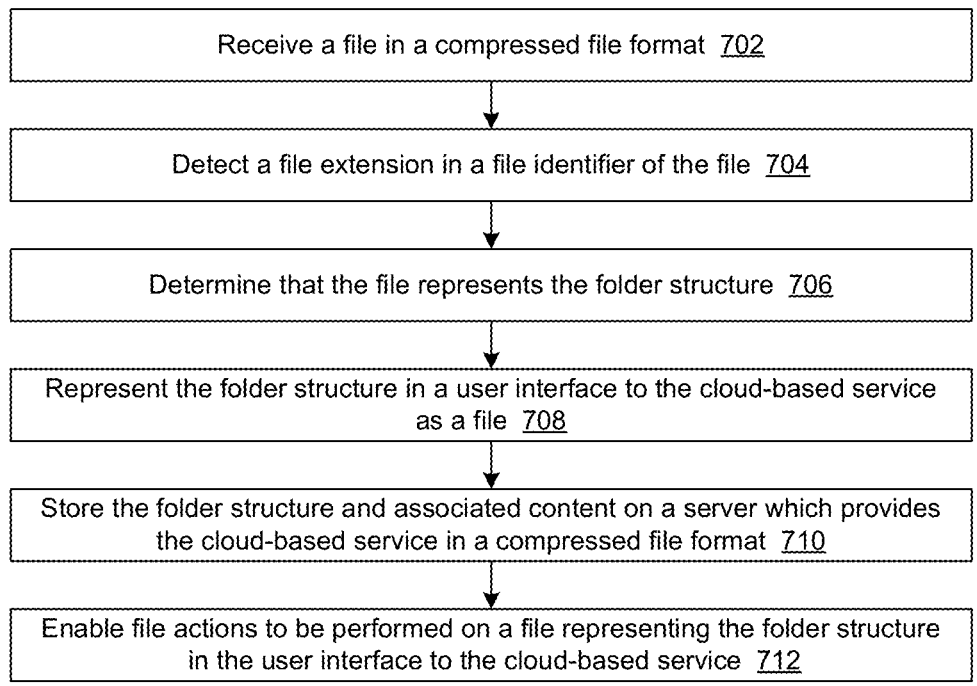
FIG. 7 depicts a flow chart illustrating an example process for enabling file actions to be performed on a file representing a folder structure in the user interface to the cloud-based service.

FIG. 7 depicts a flow chart illustrating an example process for enabling file actions to be performed on a file representing a folder structure in the user interface to the cloud-based service.

In process 702, a file is received in a compressed file format. The file can, for example, include a compressed folder structure and any associated content. The compression can be performed by a sync client (e.g., desktop or mobile sync client). In one embodiment, the folder structure is associated with metadata to indicate its representation as the file and the compression is performed in response to detecting this metadata. For example, the compressing can be performed at a device (e.g., user device, smartphone, laptop, tablet, netbook, etc.) which is remote from the server. The device from which the folder structure (and/or its associated content) is uploaded to the server providing the cloud-based service in a compressed format (e.g., the TAR compression format). Additional compressed formats that can be used include by way of example but not limitation, gzip, zip, rar, etc.

In general, the associated content includes multiple files of different or same file types shown as a single file to a user (e.g., a MAC package in the MAC or iOS operating system). An example of a file representing multiple files can be a MAC package file for Omnigraffle or iWork applications. In process 704, a file extension in a file identifier of the file is detected. The file extension may be predetermined as agreed upon between a desktop/mobile sync client with the cloud server, or selected from a predetermined list.

In process 706, it is determined that the file represents the folder structure, in one embodiment, from the file extension or other indications from the file identifier. In process 708, the folder structure is represented in a user interface (e.g., a web-based interface) to the cloud-based service as a file.

In process 710, the folder structure and associated content are stored on a server which provides the cloud-based service in the compressed file format. In some instances, the folder structure is also represented (e.g., to a user or in the user interface) as a file in its native operating system, where, the metadata is set by the native operating system to indicate file representation of the folder structure in the native operating system.

Such metadata can be used by the native operating system to treat the file as its appropriate structure, which can actually include multiple files, multiple folders with files, or any structured or unstructured data, file, or folder hierarchy. In general, the set of files can be represented or stored by the native operating system in a flat or branched folder structure, or any other structures, while being presented in the native operating system to the user via the user interface.

In process 712, file actions to be performed on a file representing the folder structure are enabled in the user interface to the cloud-based service. Such file actions are illustrated with references to example screenshots shown in FIG. 4A-FIG. 4B.

In one embodiment, the file is downloadable, via access through the cloud-based service, in the compressed file format. The compressed file can be downloaded to any platform or operating system whether it is native or non-native to the original uncompressed file. In one embodiment, the associated content stored in the compressed file format is extractable via a browser (e.g., desktop browser or mobile browser) that is native to the native operating system on a device remote from the server. For example, via Safari or other MAC based browsers for a package created in or for the MAC operating system, or by a MAC application.

In one embodiment, the file can downloadable to its native operating system on a remote device, for example, via a mobile or desktop client (e.g., a synchronization client). In general, the cloud-based service includes a collaborative service deployed in an organization such as an enterprise environment where users or collaborators can work on the files/folders in the cloud, including the files (e.g., packages) which are actually multiple folders or files in their native operating environments.

Given the collaborative nature, the cloud service enables the file representing multiple files or folders to be downloadable to a non-native operating system on a first device (e.g., by a first user or collaborator) and re-uploadable to the server by the first device; thereafter, the file is subsequently downloadable to a second device and extracted to be operable in the native operating system on the second device. Therefore, the files or packages of files do not become corrupt or otherwise inoperable from having been accessed from or downloaded to devices of different platforms/operating systems, as is the nature of collaborative environments supported by a cloud file sharing and/or storage service.

FIG. 8 depicts a table 800 illustrating example user actions which can be performed when using the cloud service which handles packages or sets of files that a user would typically locally view and access as a single file (e.g., a MAC Package).

Figure 9:
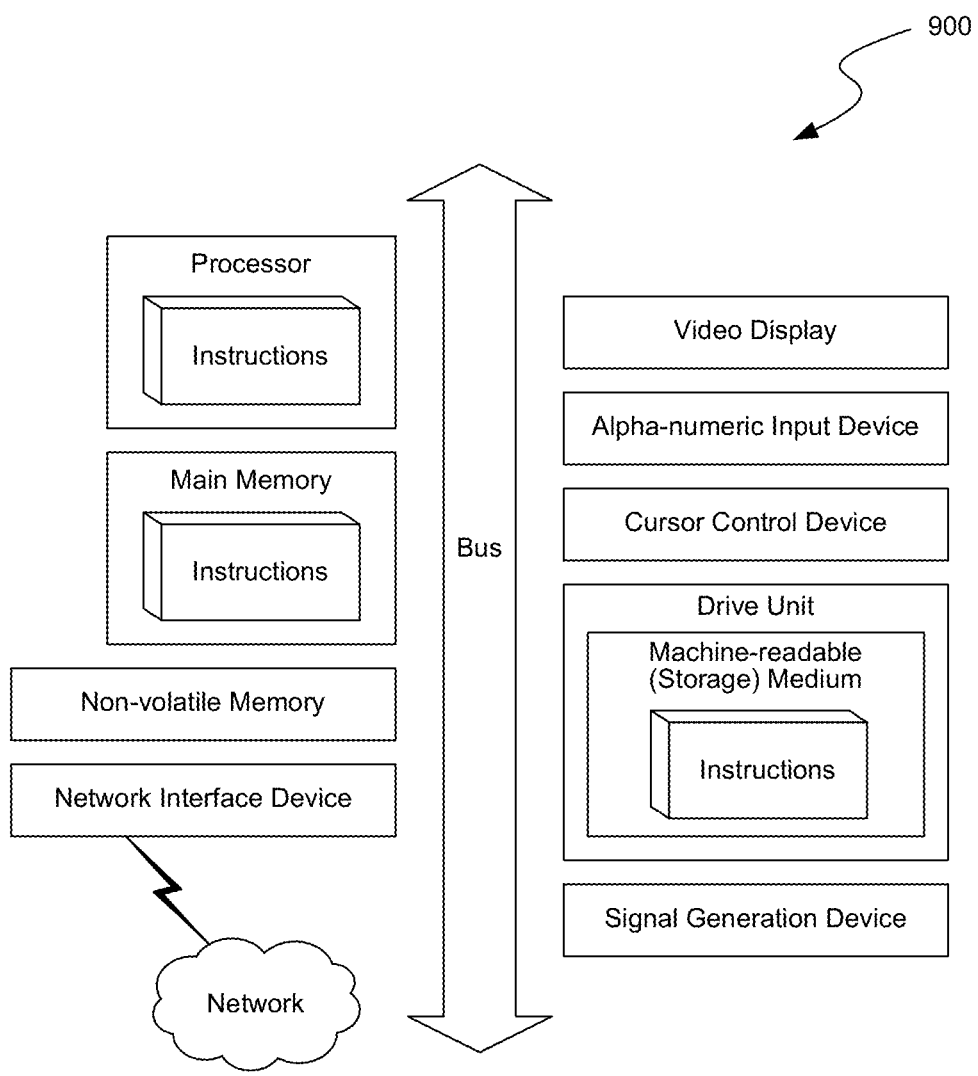
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine 900 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an IPHONE, an IPAD, a BLACKBERRY, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 900 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A computer-implemented method for enabling users to perform file actions at a server hosting a cloud-based service, the method, comprising:
    receiving a file having a pre-determined extension at a server hosting the cloud-based service, wherein the file is in a compressed file format and the pre-determined extension is appended to an original filename by a client application that communicates with the server hosting the cloud-based service for facilitating the upload of the file to the server hosting the cloud-based service;
    determining, at the server, that the file represents a folder structure by detecting the pre-determined file extension, wherein the file representative of the folder structure includes a plurality of files or folders received from the client application;
    storing the file representative of the folder structure at the server hosting the cloud-based service;
    presenting the file representative of the folder structure as a single file; and
    enabling file actions on the file representative of the folder structure, wherein the file actions taken on the file representative of the folder structure appear as being performed on the single file;
    receiving, at the server, a request for renaming the file representative of the folder structure based on a filename extension that includes the pre-determined extension, and
    in response to the request, preventing the renaming of the file representative of the folder structure.

2. The method of claim 1, wherein, the folder structure is associated with metadata to indicate the representation of the folder structure as the single file.

3. The method of claim 2, wherein, the folder structure is represented as a file in a native operating system associated with the folder structure; wherein, the metadata is set by the native operating system to indicate the representation of the folder structure as the single file in the native operating system.

4. The method of claim 1, wherein the file representative of the folder structure includes multiple files of different file types or a same file type.

5. The method of claim 1, wherein, the predetermined file extension is not depicted in a file name used for the file representative of the folder structure.

6. The method of claim 1, wherein, the pre-determined file extension is appended based on the folder structure, wherein, the folder structure is represented as the single file.

7. The method of claim 2, wherein, the compressed file format preserves the metadata associated with the folder structure the metadata indicating the representation of the folder structure as the single file, wherein, the compressed file format includes the TAR compression file format.

8. The method of claim 1, wherein, the folder structure includes a MAC package for the MAC operating system or the iOS operating system; wherein, the MAC package includes a file for Omnigraffle or a file for iWork.

9. The method of claim 1, wherein, the folder structure includes a hierarchy of folders or an application installation file.

10. The method of claim 1, wherein, the folder structure includes unstructured data or structured data.

11. The method of claim 1, wherein, the folder structure includes unstructured data or structured data associated with Windows operating systems or Windows mobile operating systems.

12. The method of claim 1, wherein, the file actions include one or more of lock/unlock of the single file, download of the single file, assign the single file in a task, comment on the file representative of the folder structure, or preview of the file representative of the folder structure.

13. The method of claim 1, wherein, the file is downloadable as a file in the compressed format.

14. The method of claim 1, wherein, the cloud-based service includes a collaborative service deployed in an enterprise environment.

15. A method to enable a cloud service hosted by a server to handle a set of files, the method, comprising:
    generating, at a client device, a compressed file by compressing the set of files depicted as a single file in the operating system, the single file representative of a folder structure that includes the set of files, wherein the single file representative of the folder structure includes a plurality of files or folders received from a client application;
    appending a pre-determined extension to an original filename of the compressed file by a client application running on the client device and that communicates with the server for facilitating the upload of the file to the server;
    uploading the compressed file to the server for the cloud service,
    wherein, the compressed file is generated and uploaded when at least one file in the set of files is modified,
    receiving, at the client device, a request for renaming the compressed file based on a filename extension that includes the pre-determined extension; and
    in response to the request preventing the renaming of the compressed file.

16. The method of claim 15, further comprising, computing and storing a hash value of the compressed file; wherein, the compressed file is generated by a desktop client of the cloud service.

17. The method of claim 15, wherein the set of files are compressed in response to detecting associated metadata indicating that the set of files is represented as the single file in the operating system wherein a format of the compressed file preserves the associated metadata.

18. The method of claim 15, wherein pre-determined extension is detectable by the server for the cloud service, the pre-determined server indicating that the compressed file includes the set of files depicted as the single file in an operating system wherein the set of files are represented or stored by the operating system in a flat or a branched folder structure.

19. A system for enabling file actions to be performed on a folder structure in a web-based collaboration environment, the system, comprising:
  a server hosting the web-based collaboration environment and having a processing unit coupled to memory having stored thereon instructions which when executed by the processing unit cause the processing unit to:
    receive a file having a pre-determined extension at the server hosting the web-based collaboration environment, wherein the file is in a compressed file format and the pre-determined extension is appended to an original filename by a client application that communicates with the server hosting the web-based collaboration environment for facilitating the upload of the file to the server hosting the web-based collaboration environment;
    determine, at the server, that the file represents a folder structure by detecting the pre-determined file extension,
      wherein the file representative of the folder structure includes a plurality of files or folders received from the client application;
    store the file representative of the folder structure at the server hosting the web-based collaboration environment,
    present the file representative of the folder structure as a single file,
    allow file actions to be performed on the file representative of the folder structure, wherein the file actions on the folder structure appear as being performed on the single file
    receive, at the server, a request for renaming the file representative of the folder structure with a filename extension that includes the pre-determined extension, and
    in response to the request, preventing the renaming of the file representative of the folder structure.

20. The system of claim 19, wherein the file in the compressed file format is extractable via a browser on a device remote from the server wherein the file representative of the folder structure is downloadable on the remote device.

21. The system of claim 20, wherein the file representative of the folder structure is downloadable via a synchronization client, a mobile client, or a mobile browser.

22. The system of claim 20, wherein, the file representative of the folder structure is downloadable to a non-native operating system on a first device and re-uploadable to the server by the first device wherein the file representative of the folder structure is subsequently downloadable to a second device and extracted to be operable in the native operating system on the second device.

23. A non-transitory computer-readable storage medium storing a set of instructions which when executed by a computing server system causes the computing server system to enable file actions to be performed on a folder structure in a cloud-based service, the system, comprising:
  receiving a file having a pre-determined extension at a computing server system hosting the cloud-based service, wherein the file is in a compressed file format and the pre-determined extension is appended to an original filename by a client application that communicates with the computing server system;
  determining, at the computing server system, that the file represents a folder structure by detecting the pre-determined file extension in the received file, wherein the file representative of the folder structure includes a plurality of files or folders received from the client application;
  storing the file representative of the folder structure at the computing server system;
  wherein, the compressed file format preserves the metadata associated with the file representative of the folder structure, the metadata indicating a representation as a single file;
  receiving, at the computing server system, a request for renaming the file representative of the folder structure based on a filename extension that includes the pre-determined extension; and
  it response to the request, preventing the renaming of the file representative of the folder structure.

24. The computer-readable storage medium of claim 23, further comprising:
  enabling file actions to be performed on the file representative of the folder structure.

* * * * *